(12) United States Patent
VandenBerge et al.

(10) Patent No.: US 8,602,183 B2
(45) Date of Patent: Dec. 10, 2013

(54) ENERGY ABSORBER WITH DOUBLE-ACTING CRUSH LOBES

(75) Inventors: Thomas C. VandenBerge, Hudsonville, MI (US); Scott D. Wilde, Grand Haven, MI (US); Joel M. Cormier, Lathrup Village, MI (US); Geoffrey A. Mills, Lake Orion, MI (US); David Zecchin, Sterling Heights, MI (US)

(73) Assignees: Shape Corp., Grand Haven, MI (US); Autoliv ASP, Inc., Ogden, UT (US)

( * ) Notice: Subject to any disclaimer, the term of this patent is extended or adjusted under 35 U.S.C. 154(b) by 275 days.

(21) Appl. No.: 12/822,310

(22) Filed: Jun. 24, 2010

(65) Prior Publication Data

US 2010/0326782 A1    Dec. 30, 2010

Related U.S. Application Data

(60) Provisional application No. 61/220,032, filed on Jun. 24, 2009.

(51) Int. Cl.
*F16F 7/12* (2006.01)

(52) U.S. Cl.
USPC ............ 188/377; 188/372; 280/752; 280/753

(58) Field of Classification Search
USPC ........ 188/371, 372, 377; 296/187.03, 187.05, 296/187.06, 187.09; 267/64.27
See application file for complete search history.

(56) References Cited

U.S. PATENT DOCUMENTS

| | | | |
|---|---|---|---|
| 3,565,398 A * | 2/1971 | Floria et al. | ............... 254/93 HP |
| 4,978,136 A | 12/1990 | Tomita et al. | |
| 5,382,051 A | 1/1995 | Glance | |
| 5,549,327 A | 8/1996 | Rusche et al. | |
| 5,839,756 A | 11/1998 | Schenck et al. | |
| 6,032,978 A | 3/2000 | Spencer et al. | |
| 6,170,871 B1 | 1/2001 | Goestenkors et al. | |
| 6,193,272 B1 * | 2/2001 | Aigner et al. | ............... 280/730.1 |
| 6,203,057 B1 | 3/2001 | Spencer et al. | |
| 6,213,497 B1 | 4/2001 | Spencer et al. | |
| 6,299,965 B1 | 10/2001 | Keshavaraj | |
| 6,305,710 B1 | 10/2001 | Bosgieter et al. | |
| 6,619,689 B2 | 9/2003 | Spencer et al. | |
| 6,682,128 B2 | 1/2004 | Carroll, III et al. | |
| 6,712,385 B2 | 3/2004 | Enders | |
| 6,758,493 B2 | 7/2004 | Conlee et al. | |
| 6,783,154 B2 | 8/2004 | Persson et al. | |
| 6,848,715 B2 | 2/2005 | Nelson et al. | |

(Continued)

FOREIGN PATENT DOCUMENTS

JP    2006143147 A    6/2006

*Primary Examiner* — Thomas Irvin
(74) *Attorney, Agent, or Firm* — Price Heneveld LLP

(57) ABSTRACT

An energy absorber includes opposing aligned crush lobes expandable in opposite directions, and when expanded, potentially collapse with different energy-absorbing rates and stroke distances. The energy absorber forms a subassembly design that is adaptable and easily modified for predetermined energy absorption crush curves and specific energy-absorbing circumstances, such that it can be used inside a vehicle passenger compartment or outside a vehicle in different locations, such as for a knee bolster on the instrument panel, or on a door inner panel, or on an under-knee seat component, or on a headliner or A-pillar cover, or hood-lifter for pedestrian safety. One version of the energy absorber includes formed sheets bonded along a perimeter to define two cavities and an inflator-holding pocket connected to the cavities by integrally-formed tunnels.

39 Claims, 9 Drawing Sheets

(56) References Cited

U.S. PATENT DOCUMENTS

| | | | | |
|---|---|---|---|---|
| 6,874,811 | B2 | 4/2005 | Enders et al. | |
| 6,886,856 | B2 | 5/2005 | Canterberry et al. | |
| 6,910,714 | B2 * | 6/2005 | Browne et al. | 280/753 |
| 6,929,280 | B2 * | 8/2005 | Yasuda et al. | 280/728.2 |
| 6,976,706 | B2 | 12/2005 | Smith et al. | |
| 7,007,970 | B2 * | 3/2006 | Yasuda et al. | 280/728.3 |
| 7,125,045 | B2 | 10/2006 | Fuks et al. | |
| 7,159,685 | B2 * | 1/2007 | Knight-Newbury et al. | 180/274 |
| 7,182,191 | B2 | 2/2007 | Scott et al. | |
| 7,222,897 | B2 | 5/2007 | Evans et al. | |
| 7,246,677 | B2 * | 7/2007 | Fredriksson et al. | 180/274 |
| 7,290,787 | B2 | 11/2007 | Hayakawa | |
| 7,296,822 | B2 | 11/2007 | Bakhsh et al. | |
| 7,334,812 | B2 * | 2/2008 | Abe | 280/729 |
| 7,350,852 | B2 | 4/2008 | Rust et al. | |
| 7,354,065 | B2 | 4/2008 | Muramatsu et al. | |
| 7,367,587 | B2 * | 5/2008 | Taoka | 280/751 |
| 7,380,822 | B2 * | 6/2008 | Abe | 280/743.1 |
| 7,393,013 | B2 | 7/2008 | Best et al. | |
| 7,396,040 | B2 | 7/2008 | Enders et al. | |
| 7,891,705 | B2 * | 2/2011 | Dennis | 280/743.1 |
| 2001/0054811 | A1 | 12/2001 | Spencer et al. | |
| 2002/0036402 | A1 | 3/2002 | Heigl et al. | |
| 2002/0149187 | A1 | 10/2002 | Holtz et al. | |
| 2003/0227184 | A1 | 12/2003 | Evans | |
| 2004/0169381 | A1 | 9/2004 | Evans et al. | |
| 2005/0017520 | A1 | 1/2005 | Evans et al. | |
| 2005/0098984 | A1 | 5/2005 | Matsumura | |
| 2005/0253369 | A1 * | 11/2005 | Taoka | 280/752 |
| 2006/0028009 | A1 | 2/2006 | Hasebe et al. | |
| 2007/0114772 | A1 | 5/2007 | Evans | |
| 2008/0011536 | A1 * | 1/2008 | Pipkorn et al. | 180/274 |
| 2008/0018029 | A1 * | 1/2008 | Leonard | 267/64.27 |
| 2008/0147278 | A1 | 6/2008 | Breed | |

* cited by examiner

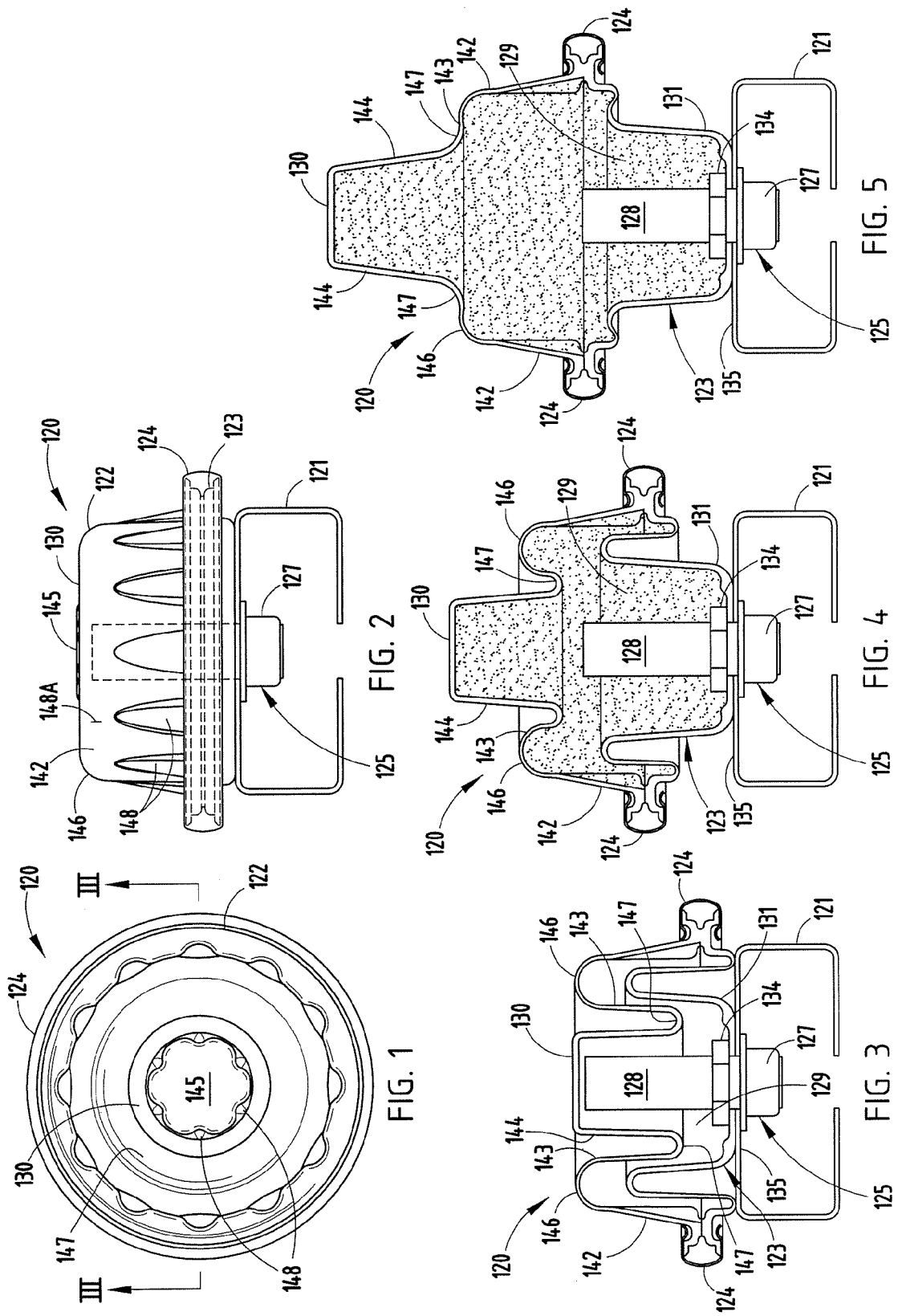

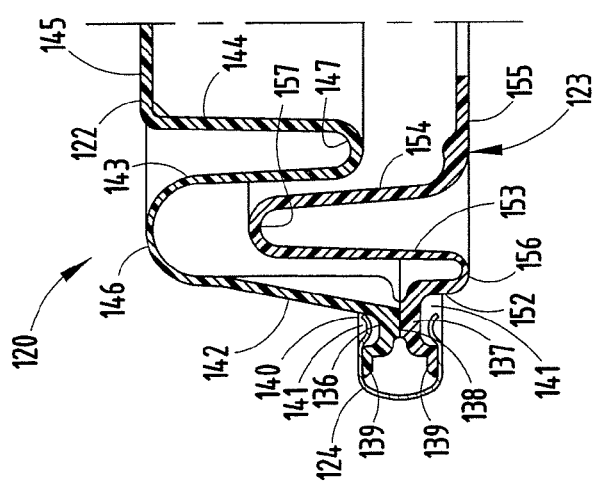
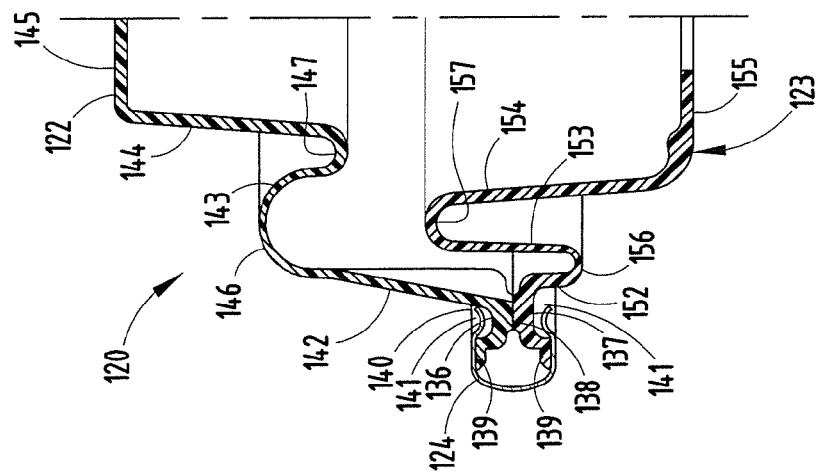
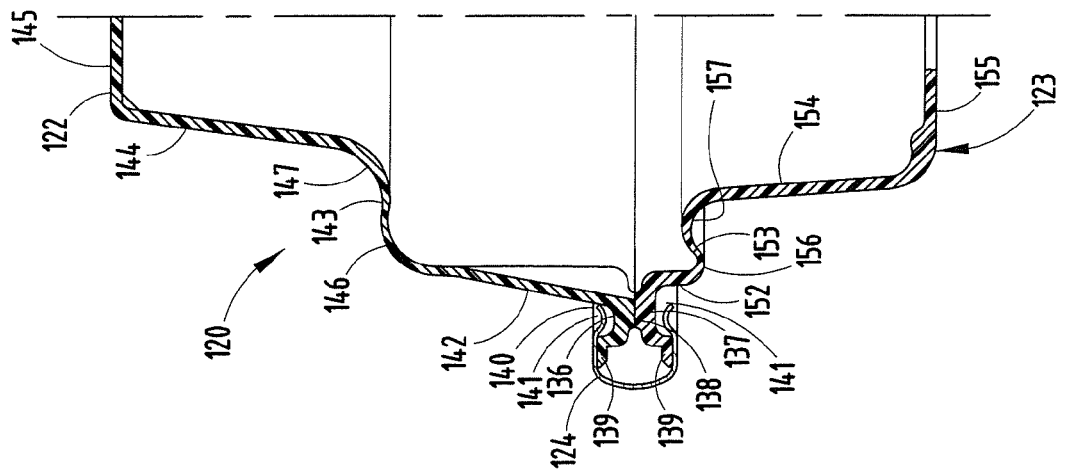

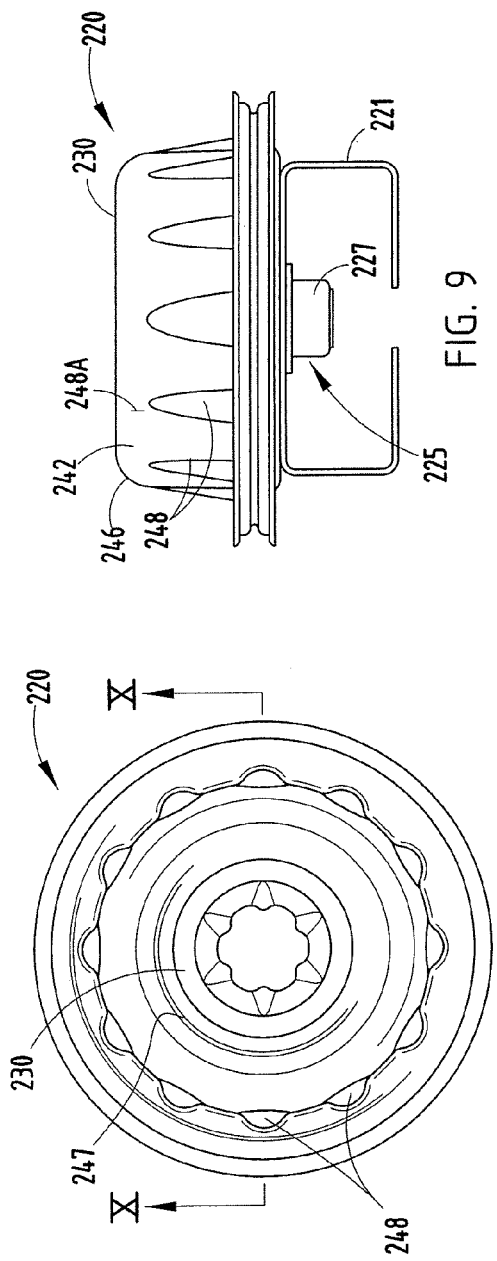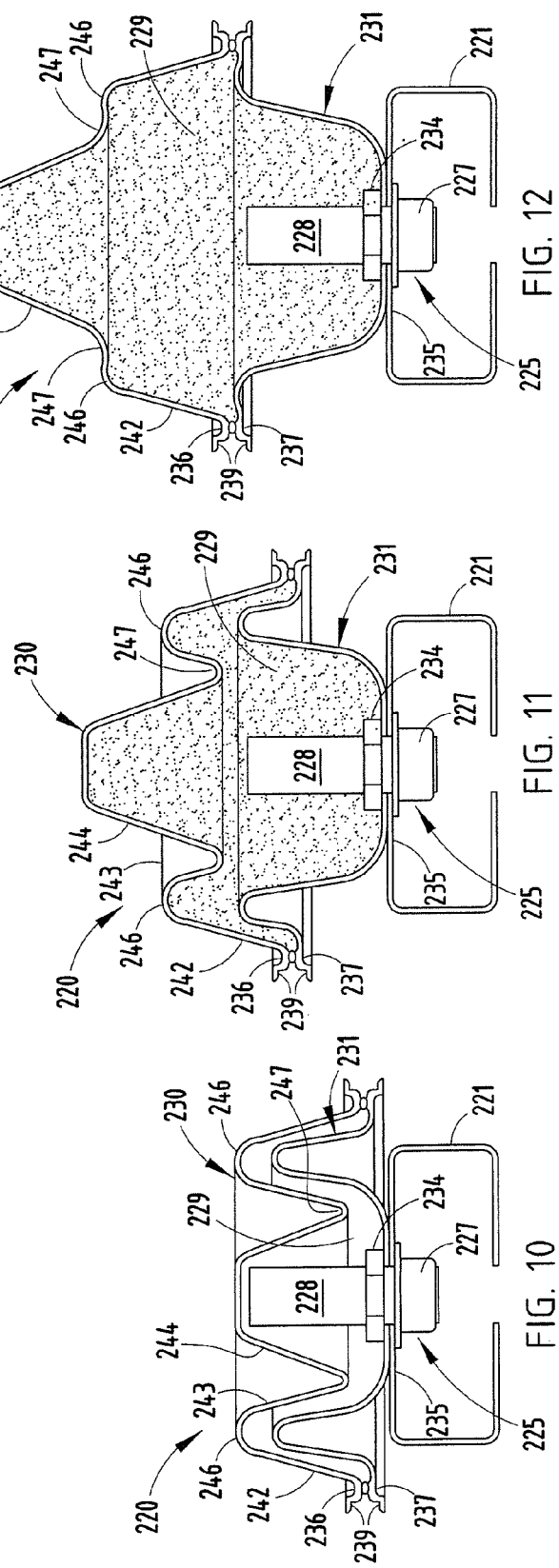

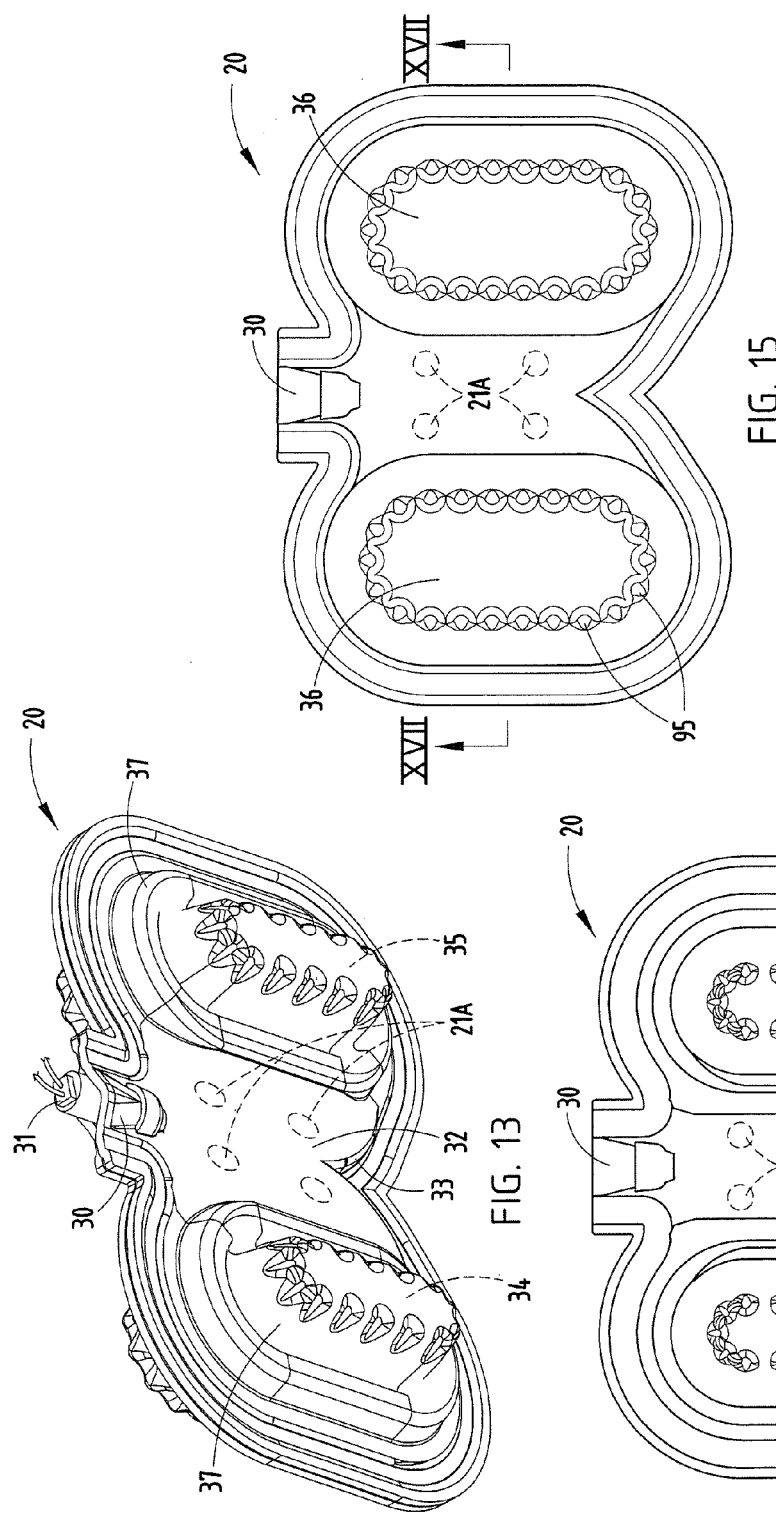

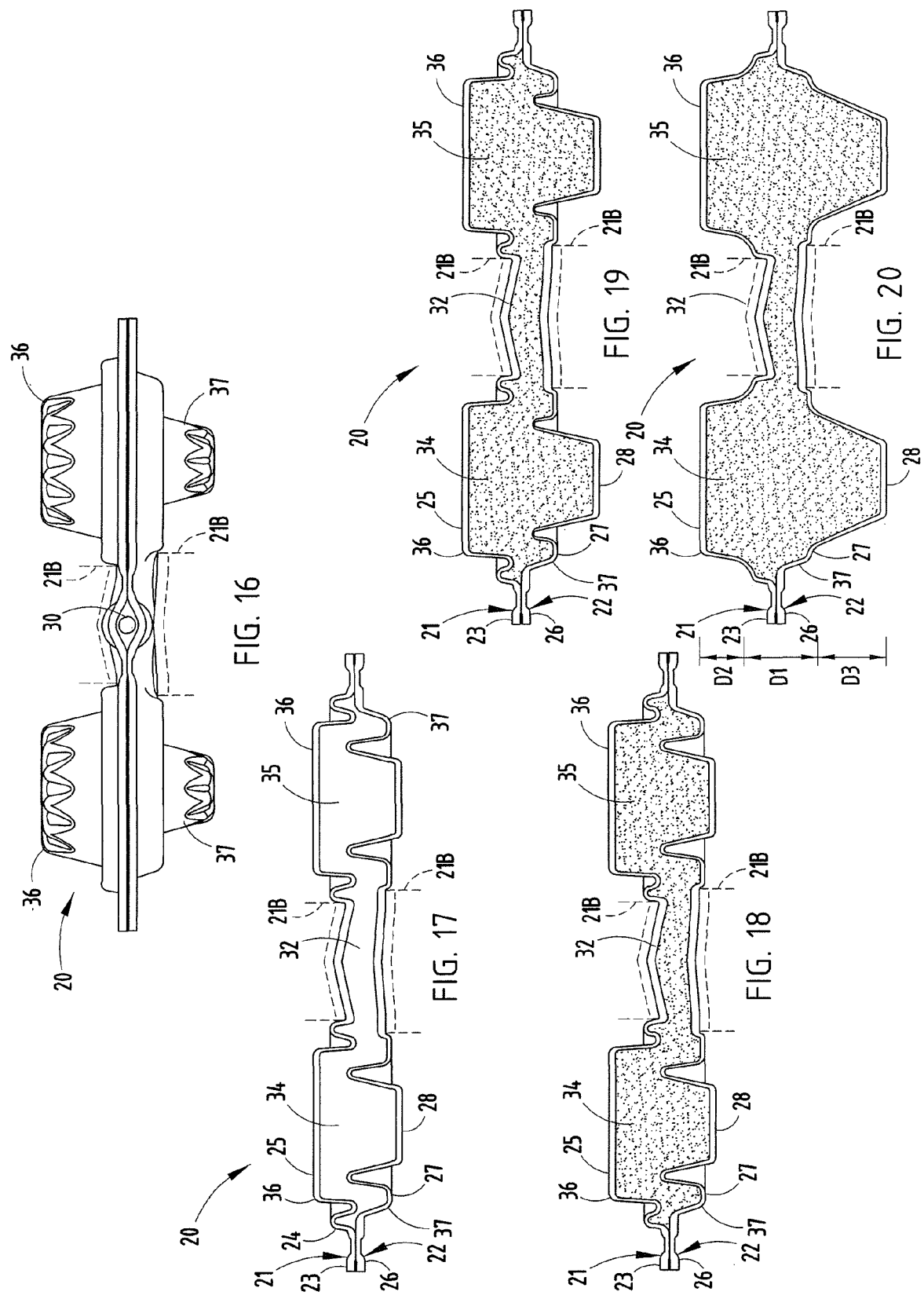

ENERGY ABSORBER WITH DOUBLE-ACTING CRUSH LOBES

CROSS-REFERENCE TO RELATED APPLICATIONS

This application claims benefit under 35 U.S.C. §119(e) of provisional application Ser. No. 61/220,032, filed Jun. 24, 2009, entitled ENERGY ABSORBER WITH DOUBLE ACTING CRUSH LOBES, the entire contents of which are incorporated herein by reference.

BACKGROUND

The present invention relates to energy absorber constructions, and more particularly relates to an energy absorber construction with aligned crush lobes expandable in opposite directions for increased crush stroke and that can be customized for stepped energy absorption. The present inventive concepts are useful in vehicles for passenger safety and for pedestrian safety, but are not limited to only those areas.

Energy absorption is important in vehicles for occupant safety in the event of a vehicle crash. Energy absorption occurs in components that provide a combination of optimal crush resistance and impact stroke, with the crush resistance avoiding spikes while providing optimal maximum energy absorption, and the impact stroke being sufficiently long to allow energy absorption without itself providing injury to the vehicle occupant or impacted pedestrian. However, there are conflicting requirements. For example, components providing an increased impact stroke length also tend to take away from passenger space in a vehicle's passenger compartment, which space is already at a premium due to downsized vehicles. Also, increased vehicle weight due to added components can be problematic.

Aside from conflicting requirements related to crush stroke lengths, it is important to control crush resistance over the impact stroke. Some less severe crashes require minimal crush resistance and/or minimal crush stroke, while more severe vehicle crashes require maximum crush resistance and preferably longer crush stroke lengths. Further, sometimes it is desirable to incorporate stepped increases in crush resistance over a given crush stroke, so that one component arrangement can provide different optimized energy absorption for different crash scenarios. Further, it is desirable to provide the energy absorber as an assembled unit, minimizing total cost while using few components. This allows one to maximize vehicle value by minimizing component cost and assembly time yet while maximizing function(s) and aesthetics of the overall vehicle. All of this must preferably be done cost-effectively, efficiently, and must not result in overly complex or expensive parts and components.

Notably, many energy absorber constructions are not easy to modify to fit particular package spaces, nor to allow particular mounting situations, nor to provide particular stepped energy absorption, nor to provide customizable crush strokes. An energy absorber construction is desired that provides flexibility of design and shape and mounting, while also taking up a minimum of space, using few components, and yet meets all functional requirements, including operation at high and low temperatures.

In addition to vehicle passenger safety, modern vehicles are being designed for improved pedestrian safety. For example, when a collision with a pedestrian occurs, the pedestrian often falls onto the vehicle's hood, with the pedestrian's head striking a rear of the hood and/or the vehicle's front windshield. This can cause a concussion and/or other head injury. The resulting head injury can potentially be reduced by "softening" the head impact. One alternative is to lift a rear of the hood in a severe pedestrian impact prior to engagement in order to cushion engagement of the head against vehicle components. However, there are many functional and aesthetic requirements of a hood, especially near the vehicle's front windshield, including appearance, control of engine noise, control of air flow and/or water flow, occupant safety issues (i.e., from the hood being driven toward the windshield), and coordination with placement and shape of any safety device with the vehicle's cowl and other vehicle components such as vehicle windshield wipers. Thus, the task of reducing head impact is not easily done.

SUMMARY OF THE PRESENT INVENTION

In one aspect of the present invention, an energy absorber includes first and second polymeric panel members with opposing walls attached together, the opposing walls each defining at least one pair of crush lobes that define at least one cavity therebetween, with each crush lobe being movable between a collapsed position where the crush lobes are collapsed toward each other and an expanded position where the crush lobes are expanded in generally opposite directions. The energy absorber further includes an inflator connected to the cavity for expanding the crush lobes prior to an impact.

In another aspect of the present invention, an energy absorber includes first and second polymeric panel members with opposing walls attached together, the opposing walls each defining at least one pair of crush lobes that define at least one cavity therebetween, with each crush lobe having a sidewall extending partially into a cavity defined by the other crush lobe in the at least one pair. The energy absorber further includes an inflator connected to the cavity for expanding the crush lobes prior to an impact.

In another aspect of the present invention, an energy absorber construction includes first and second panel members with opposing walls attached together, the opposing walls defining aligned crush lobes extending in opposite directions and defining a sealed cavity therebetween and that are each movable between a collapsed position where the crush lobes are collapsed toward each other and an expanded position where the crush lobes are expanded in opposite directions. At least one of the crush lobes includes sidewalls having an offset ring section adapted to unroll when the crush lobe is expanded and later roll and collapse when the crush lobe is compressed from the expanded position toward the retracted position. By this arrangement, when the crush lobes are in the expanded position and the construction is impacted, energy is absorbed both by the offset ring section of the sidewalls rolling and also by compressed fluid in the sealed cavity.

In another aspect of the present invention, an energy absorber construction includes a two-direction expandable energy absorber including opposing walls with crush lobes sealed together to define a common cavity and a passage extending to a center region, the opposing walls each including at least one of the crush lobes and each crush lobe being configured to move from an outward expanded position toward a collapsed retracted position. The energy absorber further includes an inflator in its center region for expanding the crush lobes from the retracted position to the expanded position.

In another aspect of the present invention, a safety device for use in a vehicle to reduce injury to a passenger's leg due to a vehicle crash includes an energy absorbing assembly including first and second clamshell members with opposing walls and with perimeters attached together to define a sealed cavity. The walls each include a crush lobe that is configured to move between a retracted position and an outward expanded position. The assembly further includes an actuator for expanding the crush lobes from the retracted position to the expanded position. A support member supports the assembly in a position proximate the legs of a passenger, the support member being one of an instrument panel support structure or a passenger seat. A cover has an aesthetic first surface for covering the assembly.

In another aspect of the present invention, an energy absorber construction includes an energy absorber having adjacent panels forming at least one pair of aligned crush lobes configured to move between a collapsed position adjacent each other and an extended position away from each other, the crush lobes each including an outer wall section extending from the associated panel, an intermediate wall section extending from the outer wall section, and an inner wall section extending from the intermediate wall section, the intermediate wall section being more flexible than the inner and outer walls sections so that during extension from the collapsed position to the extended position, ends of the intermediate wall section roll into alignment with the inner and outer wall sections, and during collapse from the extended position toward the collapsed position, the ends of the intermediate wall section roll toward and re-align with the intermediate wall section. The energy absorber construction further includes an inflator connected to the energy absorber to cause extension of the crush lobes from the collapsed position to the extended position.

In a narrower form, the offset ring sections have a cross section defining a first radii that is between about 1 and 10 mm and wall thickness between about 0.5 and 5 mm so that upon rapid movement from the retracted position to the expanded position, the offset ring sections unroll and do not fracture, but during movement from the expanded position to the retracted position the offset ring sections roll in a manner absorbing energy.

Related methods also form a part of the present invention.

These and other aspects and features of the present invention will be understood and appreciated by those skilled in the art upon studying the following specification, claims, and appended drawings.

BRIEF DESCRIPTION OF DRAWINGS

FIGS. 1-2 are top and side views of an energy absorber construction including opposing panels securely clamped together with aligned crush lobes, and an inflator for expanding same.

FIGS. 3-5 are cross-sectional views taken along line III in FIG. 1, FIGS. 3-5 showing the aligned crush lobes in collapsed/stored, partially expanded, and fully expanded positions.

FIGS. 6, 6A, and 7 are fragmentary enlarged views of a left portion of FIGS. 3-5, respectively.

FIGS. 8-9 are top and side views of a modified energy absorber construction including opposing panels securely bonded together with aligned crush lobes, and an inflator for expanding same.

FIGS. 10-12 are cross-sectional views taken along line X-X in FIG. 8, FIGS. 10-12 showing the aligned crush lobes in collapsed/stored, partially expanded, and fully expanded positions.

FIG. 13-16 are perspective, top, bottom, and side views of a modified energy absorber construction including opposing panels secured together with aligned oblong crush lobes, and an inflator for expanding same.

FIGS. 17-20 are cross-sectional views taken along line XVII in FIG. 15, FIGS. 17-20 showing the aligned crush lobes in collapsed/stored, first partially expanded, second partially expanded, and fully expanded positions.

FIG. 21 showing the energy absorber construction in a compact storage position; and FIG. 22 showing the energy absorber construction expanded to lift the vehicle's hood.

DETAILED DESCRIPTION OF PREFERRED EMBODIMENTS

Figure 2A:
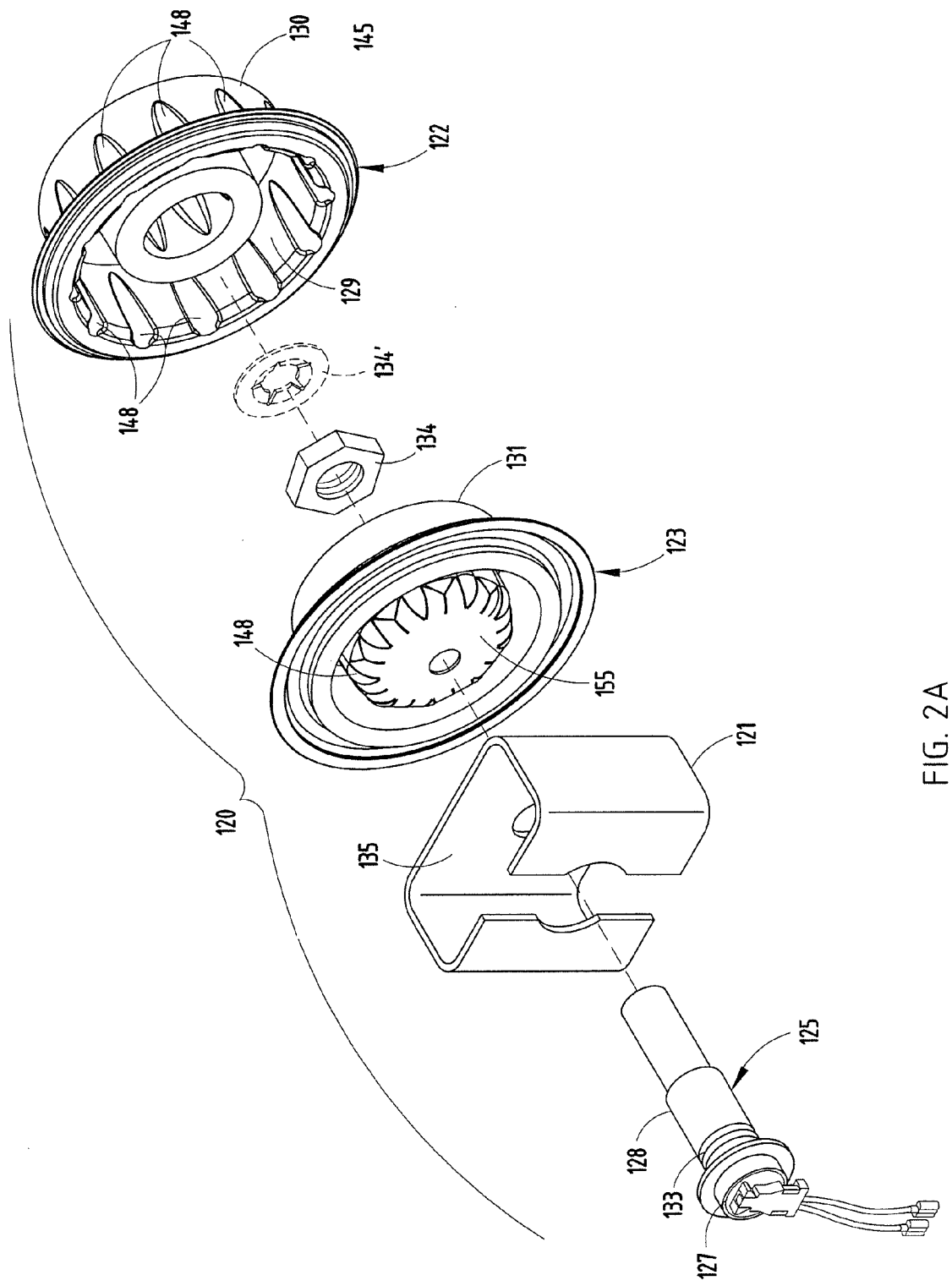
FIG. 2A is an exploded perspective view of FIG. 1.
Figure 23:
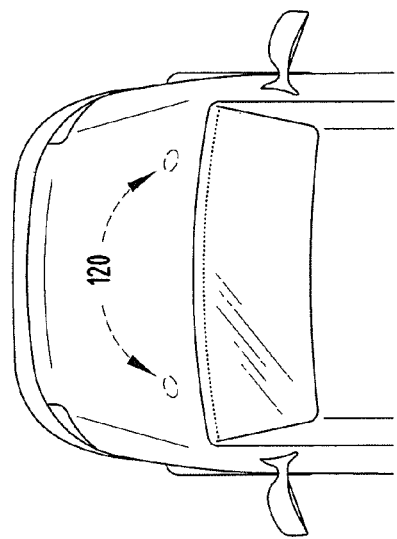
FIGS. 21-23 are side, side, and top views of a vehicle with a hood-lifting energy absorber in a stored position under a rear of the vehicle's hood.

A first embodiment of the present energy absorber construction 120 (also called an "energy absorber" herein) (FIGS. 1-6B) includes a pair of injection-molded opposing aligned crush lobes 130/131 that are in a stored "home" position until expanded, but that are expandable in opposite directions by an electronically-activated inflator 125 in communication with a cavity 129 between the crush lobes when a vehicle crash is sensed (such as when the crash is eminent), the inflator 125 being constructed to provide propellant into the cavity when an accident is sensed (or is imminent) and is activated by a controller/sensing circuit. When expanded, the energy absorber 120 provides an improved energy absorption profile due to its expanded/longer crush stroke and also due to its "designed collapsing sequence" where the opposing crush lobes collapse with desired energy-absorbing rates and stroke distances (potentially at different energy-absorbing rates and stroke distances).

Advantageously, the present energy absorber construction 120 is assembled to the vehicle in a collapsed/stored compact arrangement until use, thus maintaining open space in the passenger compartment (or maintaining open space in other locations on the vehicle) until activated. The energy absorber is configured to expand at or immediately after a vehicle crash is sensed, but prior to engaging a human (or object). By this arrangement, the present energy absorber 120 provides a longer crush stroke and hence a "softer" impact resistance (i.e., less load spikes, and lower average resistance force) while still providing an optimal energy absorbing sequence. Notably, the present energy absorber construction includes a single pair of crush lobes, but it is contemplated that the energy absorber construction can include a plurality of pairs of aligned crush lobes. This is facilitated by the double-extending arrangement where opposing crush lobes expand in opposite directions.

The present energy absorber construction 120 (FIG. 3) is mounted on a structural member such as beam 121, and includes opposing panels 122 and 123 (also called "base flanges") held together along their perimeter by a C-shaped metal retainer strip 124. The illustrated inflator 125 includes a metal tubular housing with enlarged head 127 and cylindrical tubular barrel 128 for storing the propellant and providing a controlled-supply delivery tube for gases generated when the inflator 125 is activated. It is noted that various electrically-activated prepackaged inflators are commercially available and, for example, can be purchased from Autoliv, Inc., a Sweden-based company in Stockholm.

The illustrated inflator 125 (FIG. 2) consists of a micro gas generator 127 (FIG. 3) and a diffuser 128. The micro gas generator consists of an initiator, solid propellant and a housing. The micro gas generator housing is designed to contain the solid propellant and allow initial combustion, rupturing at a predetermined location upon firing, resulting in the release of the propellant into the diffuser. The solid propellant consists of a clean burning material that efficiently burns transforming from a solid to gaseous state. Typical solid propellant loads are in the 600-900 mg range for the devices illustrated, but could vary depending on necessary inflated volume. Connected to the micro gas generator is a diffuser. The diffuser is connected to the micro gas generator via such means as crimping, welding, insert molded, or other attachment means. The method used in the illustrations are based on crimping. The diffuser itself is engineered with an appropriate thickness, gas exiting opening pattern, gas exiting pattern location, chamber volume and gas exiting size to maximize the combustion of the solid propellant without overpressuring the diffuser itself. In addition the diffuser is designed with an appropriate strength to ensure non fracturing of the material during the gas pressurizing phase. Diffuser chamber volumes are tuned appropriately for the propellant load used.

It is contemplated that a variety of different inflators can be used in place of inflator 125, depending on the functional requirements of a particular use, such as a CO2 charged cartridge or other gas-forming or pre-charged/preassembled unit.

The barrel 128 fits through a hole in the bottom panel 123 into the cavity 129 defined between aligned crush lobes 130 and 131 of panels 122 and 123. The inflator 125 is secured to the beam 121 by means appropriate for the particular application of use, such as on a diffuser mounting plate either mechanically (e.g. weld nut, or Tinnerman fastener), or adheringly (e.g. glue, adhesive, chemical bonding). For example, the illustrated inflator 125 includes threads 133 (FIG. 2A) that threadably engage mating threads in a nut 134 positioned inside the cavity 129. When threadably installed, the enlarged head 127 and nut 134 clamp the energy absorber 120 against a wall 135 of the beam 121. This construction allows the inflator 125 to be stored separate from the energy absorber 120 until assembly to a vehicle. Alternatively, the inflator 125 can be preassembled as part of the energy absorber 120, and a C-clip retainer (see washer 134') installed on the inflator 125 between the enlarged head 127 and the wall 135 of the beam 121, to thus hold the energy absorber 120 to the beam 121. Also, it is contemplated that the retainer strip 124 can be integrated into a mounting bracket that holds the energy absorber construction 120 and also is attached to a stationary vehicle component if desired. (In such case, the energy absorber construction expands in opposite directions while a center plane of the energy absorber construction 120 generally defined along the retainer strip 124 remains stationary.)

The panels 122 and 123 (FIG. 6) include perimeter flanges 136 and 137 each having abutting surfaces 138 and cantilevered legs 139 extending in an outboard direction from the abutting surfaces 138 in spaced relation. The C-shaped retainer 124 includes opposing arms that engage the legs 139 to hold them securely together, and further includes inward lips 140 that positively engage channels 141 in the perimeter flanges to hold the retainer 124 in place. The retainer 124 can be resiliently engaged by snap-attachment or with a zip-lock action, or can be deformed into its clamping position by a stamp/crimping operation. The retainer 124 can extend around the perimeter of the panels 122/123, or can include multiple sections that combine to extend around the perimeter. It is noted that the abutting surfaces 138 can also be welded or thermally bonded together, and where a sufficiently strong welding or bonding or riveting can be achieved for a particular application, the retainer 124 can be eliminated. Alternatively, the (single) retainer 124 can potentially be replaced with a plurality of individual short-width clips spaced apart along the perimeter.

The panels 122/123 include one (or more) pairs of aligned crush lobes 130/131 defining a cavity 129 therebetween, each crush lobe having an offset wall section that rolls at both ends to facilitate expansion and crushing/collapse specifically. The top crush lobe 130 (FIG. 3) in top panel 122 includes an outer wall section 142 extending from flange 136, an intermediate wall section 143, and an inner wall section 144 supporting a transverse centered flat end wall section 145. The wall sections 142-144 extend at an angle (such as 0-25 degrees) to each other but generally perpendicularly away from the base flange 136. The wall sections 143-144 preferably include a draft angle sufficient for release during manufacture, which will depend in part on how they are manufactured. A radiused ring wall section 146 connects the outer and intermediate wall sections 142 and 143, and a radiused ring wall section 147 connects the intermediate and inner wall sections 143 and 144.

The outer and inner wall sections 142 and 144 (FIGS. 6, 6A, 7) are preferably stiffer than the intermediate wall section 143 so that they maintain their shape during expansion, as discussed below. The stiffness in the wall sections 142 and 144 can be from molded-in ribs or embossed ribs, such as ribs 148, or from a greater wall thickness, or from stiffeners and/or support added to the wall sections as needed. Contrastingly, the intermediate wall section 143 (and potentially radiused wall sections 146 and 147) is preferably made more flexible than wall sections 142 and 144, such as by providing the wall sections 143 (and 146 and 147) with a thinner wall thickness. When the panel 122 (and/or panel 123) is injection molded, this can be closely controlled by mold tolerances and injection molding techniques. When thermoforming a heated flat sheet into a three-dimensional shape, the thicknesses of wall sections are controlled by the thermoforming process, such as by using pre-stretching mating dies, by zone heating, and the like.

As shown by FIGS. 6-7 and also by comparing FIG. 4 (partial expansion) and FIG. (full expansion), the radiused rings 146 and 147 in the crush lobe 130 simultaneously roll when the top crush lobe 130 expands, effectively "taking away" material from each end of the intermediate wall section 143 and adding the material inline to an end of the outer and inner wall sections 142 and 144 during the expansion process until the intermediate wall section 143 is virtually eliminated (see FIG. 5). This manner of expansion lends itself to a very uniform and predictable expansion sequence, without tearing of the material, and one which can be done within the very short time period allowed for expansion (which can be milliseconds in a vehicle crash). By making the intermediate wall section 143 more flexible than wall sections 142 and 144, the predictability and uniformity of expansion is improved. Also, the tendency of the intermediate wall section 143 to kink and/or non-uniformly expand is reduced.

The crush lobe of the bottom panel 123 is not totally dissimilar from the top panel 122. Specifically, the bottom panel 123 includes one (or more) aligned crush lobes 131 each defining a cavity 129 with the mating aligned crush lobe 130. The top crush lobe 131 includes an outer wall section 152 extending from flange 137, an intermediate wall section 153, and an inner wall section 154 supporting a transverse centered flat wall section 155. The wall sections 152-154 extend at an angle to each other but generally perpendicularly away from the base flange 137. (See discussion above regarding wall sections 142-144.) A radiused ring wall section 156 connects the outer and intermediate wall sections 152 and 153, and a radiused ring wall section 157 connects the intermediate and inner wall sections 153 and 154.

The outer and inner wall sections 152 and 154 are preferably stiffer than the intermediate wall section 153. As noted above, the stiffness in the wall sections 152 and 154 can be from ribs (see ribs 148, FIG. 2A), or from a greater wall thickness, or from stiffeners added to the wall sections as needed, or by changing the radii of rings 155/156. Contrastingly, the intermediate wall section 153 is preferably made more flexible, such as by providing it with a thinner wall thickness. The panel 123 can be injection molded, thermally formed from a sheet, compressively formed from a sheet, formed as part of a blow molding, or otherwise manufactured. The wall sections 152-154 are joined by a smaller outer radiused ring wall section 155 and a larger inner radiused ring wall section 156.

Figure 21:
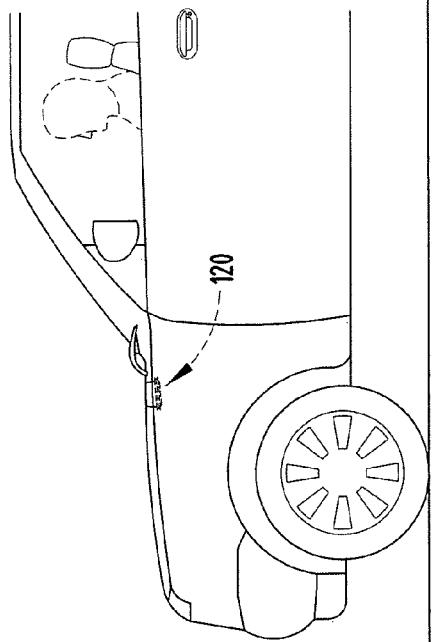
Figure 22:
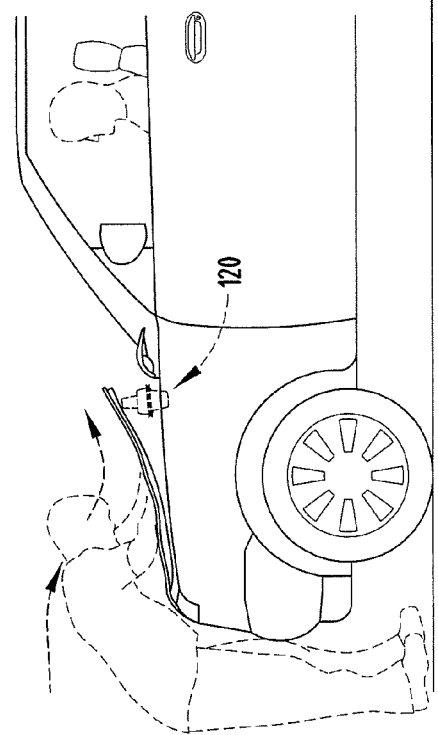
Figure 24:
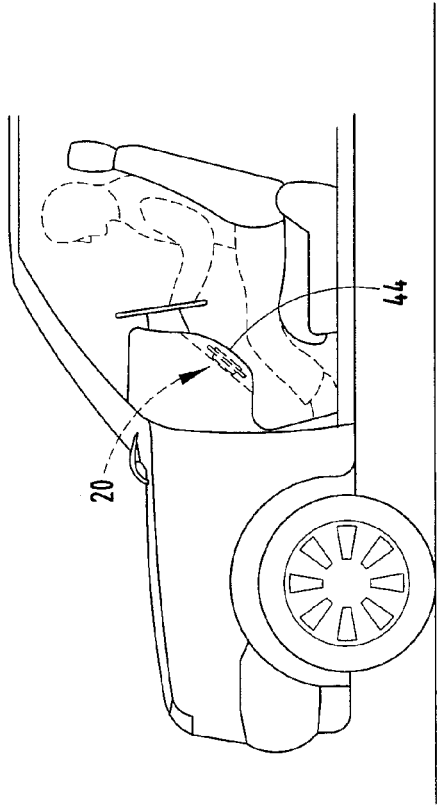
FIGS. 24-26 are side, side, and exploded perspective views of a vehicle including a knee bolster with energy absorber, FIG. 24 being in a stored position and FIG. 25 being extended and ready for engaging a vehicle occupant during a crash.
Figure 25:
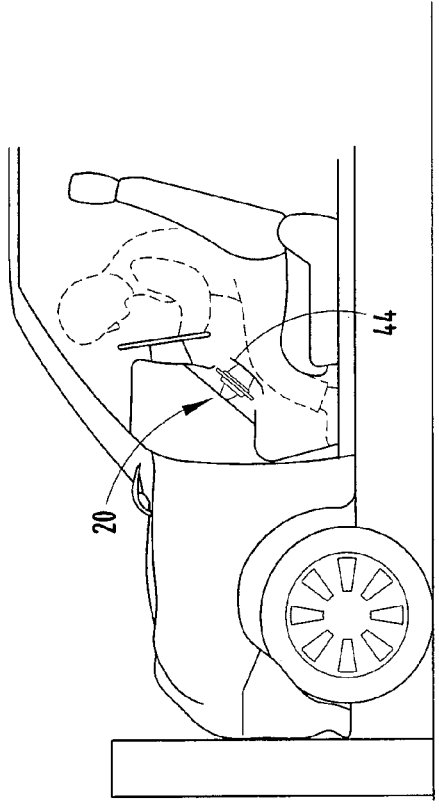
Figure 27:
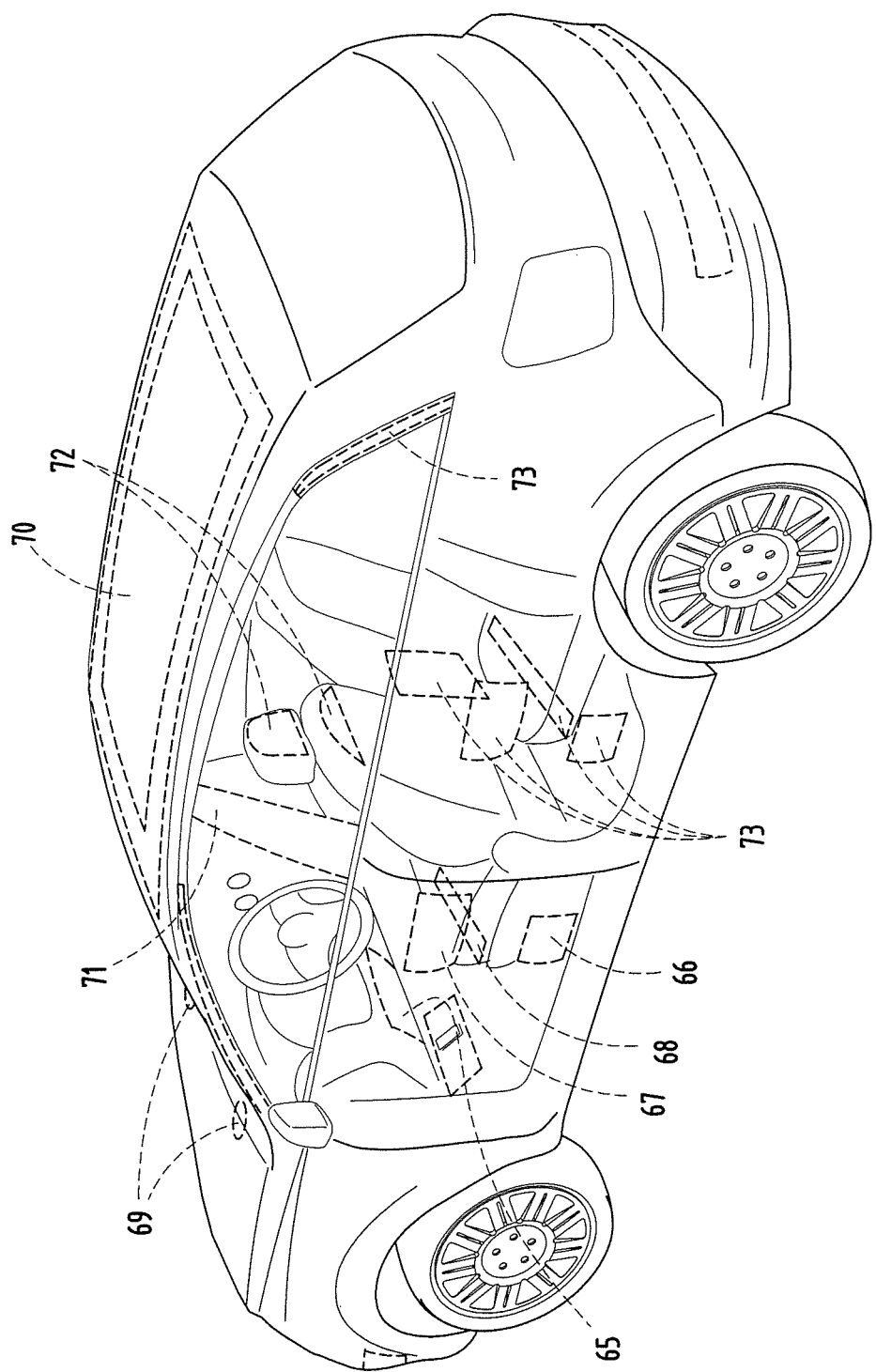
FIG. 27 is a perspective view of a vehicle showing various potential locations of use for energy absorber constructions of the present inventive concepts.

The various walls sections of the crush lobes interfit to provide a compact arrangement, with the energy absorber construction 120 having a minimal dimensional thickness much smaller than its expanded crush stroke. This allows the energy absorber to leave open the area around the energy absorber construction until it is expanded for use. For example, this is particularly advantageous in the passenger compartment of a vehicle, such as in a knee bolster area where a driver's knees require room to maneuver (see FIGS. 24-25 and 27), or in a door inner panel where the window glass must be allowed to be lowered (see FIG. 27). It is also advantageous for a hood lifter, where the hood must maintain a lower position until a passenger collision is eminent (see FIGS. 21-22, 27).

The outer and intermediate wall sections 142-143 of the top crush lobe 130 form a concavity large enough to receive the intermediate and inner wall sections 153-154 of bottom crush lobe 131. The inner and top wall section 144 and 145 of the top crush lobe 130 are shaped to provide space to receive the protruding portion of the inflator 125. This allows the energy absorber 120 to have a more compact (smaller) shape when in the "home" stored position. The metal tubular barrel 128 of inflator 125 includes laterally-oriented holes in its side wall, providing an exit for propellant/gases to leave the housing 126 and enter the cavity 129.

The crush lobes 130/131 preferably include a mechanical pressure fuse 148A (FIG. 2) (i.e., weakened or thinned material or a partial-depth slit or pneumatic valve), such as in outer wall section 142 constructed to break or near an end of during the expansion of the crush lobes, so that once inflated, gases from within the cavity 129 can escape in a controlled manner as a person impacts/strikes the expanded energy absorber 120 and causes it to collapse. During collapse (i.e., during movement from the expanded position toward the collapsed position), energy is absorbed both by the material rolling to "reform" the intermediate wall sections 143 and 153, and also due to the compressed gas acting like an energy-absorbing pillow within the cavity 129.

It is contemplated that the panels 130 and 131 can be formed (molded or thermoformed) in a ready-to-assembly position (i.e., with a shape like that shown in FIG. 3), or they can be formed in an expanded position (i.e., with a shape like that shown in FIG. 4 or 5) and then compressed to the shape of FIG. 3 prior to assembly of the energy absorber component.

The following energy absorber construction is described using the same numbers for identical and/or similar features, but with "100" added to the numbers. For example, the first energy absorber construction was identified as number 120, while the following energy absorber construction is identified as number 220. This is done to reduce redundant discussion.

Energy absorber construction 220 (FIGS. 8-12) is very similar to the energy absorber construction 120 in shape and function/operation, but modified to allow thermoforming. Hence, a detailed discussion is not necessary for a person of ordinary skill to understand it. Notably, the energy absorber construction 220 includes particularly shaped wall sections, wall thicknesses, and radii to facilitate expansion and subsequent collapse during energy absorption. Thermoforming processes are known and need not be described for a person skilled in this art to understand. Accordingly, a detailed discussion is not necessary, except as discussed below.

Depending on the particular application of use, the present panels will need to be formed by a thermoforming process where a flat sheet of polymeric material is heated then formed to a three dimensional shape using a pre-stretch (assist) die(s) in order to control undesired localized thinning of the sheet during the thermoforming process, such as may occur at corners, radii, and long-drawn wall sections. This is done by "moving material" or by pre-stretching material in the sheet in locations where the final forming process does not normally stretch material by itself.

Also, thermoforming processes tend to require additional draft angle for good release of molded parts. Still further, it is noted that polymeric materials best suited for thermoforming processes have slightly different properties than polymeric materials best suited for injection molding processes. Also, materials optimally suited for stretching/thermoforming of a sheet will have different rolling and flexing properties than materials optimally suited for injection molding. As a result, preferred wall thicknesses for a thermoformed component may be slightly different than an injection molded component. For example, compare FIGS. 3 and 10. Notably, the illustrated crush lobes 230, 231 in the thermoformed panels 222, 223 are slightly wider than the crush lobes 130, 131, and the walls slightly thicker for a similar energy absorption versus expansion-and-then-impact stroke profile. However, the crush lobes 230/231 and crush lobes 130/131 have a similar height and energy absorption profile.

Another modified energy absorber construction 20 (also called "energy absorber" and "subassembly unit") is shown in FIGS. 13-20. Energy absorber construction 20 is similar to the energy absorber constructions shown in FIGS. 1-6B and 7-11 in that it includes opposing aligned crush lobes that are expandable in two different (opposite) directions. Like the constructions 120 and 220, the energy absorber construction 20, when expanded, provides a unique level of protection due to their expanded crush stroke and also due to their "designable collapsing sequence" where the opposing crush lobes collapse with desired energy-absorbing rates and stroke distances (potentially at different energy-absorbing rates and stroke distances), where the stroke distance is greater than a depth of the stored/retracted assembly. However, in energy absorber construction 20, the crush lobes 36 and 37 have an obround shape, such that they provide an enlarged impact area. Notably, an aesthetic panel can be attached to the passenger-adjacent side of the crush lobes 36, 37 for optimizing appearance and maximizing a surface area for engaging the passenger. It is contemplated that the crush lobes may also be oblong, square, rectangular, or other elongated or non-circular shape. However, in such event, it is important to optimize wall stiffness and structural balance in the walls to assure that the crush lobes uniformly undergo expansion and later compression without kinking or exhibiting other non-uniform extending/collapsing motion. The construction 20 can be mounted along its edge flange or against the surface 28 or mounted by fasteners at location 21A such as using brackets 21B, or can be mounted in a manner similar to construction 120 (i.e. mounted by a separate fastener(s) that extend into a bottom of each crush lobe).

The illustrated construction 20 (FIG. 17) is constructed of two panels or sheets 21, 22 connected together along a perimeter. It is contemplated that the panels 21, 22 can be formed by various means, such as by vacuum thermoforming, injection molding, compression molding, blow molding, draw forming, and/or otherwise forming and assembling same. The illustrated panels 21, 22 are injection molded for optimal dimensional control over shape and wall thickness. The sheet 21 includes perimeter flange 23, channel-shaped ring section 24, and an end wall section 25 forming part of first crush lobes.

Figure 26:
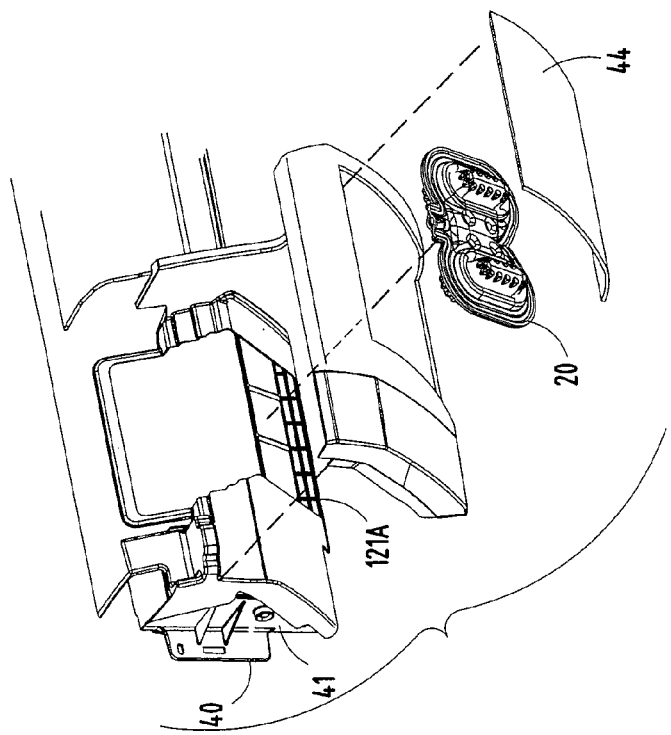

Flanges 23 and 26 abut and are thermally or chemically welded or bonded or otherwise secured together to define a sealed pocket 30 for holding an electrically-activated inflator 31 (FIG. 13) between the crush lobes. A split air feed tunnel/gateway 32 with deflector walls 33, and adjacent interior cavities 34, 35 (i.e., the space between the crush lobes) connected to the pocket 30 by tunnel 32. The illustrated construction 20 includes two pairs of crush lobes 36, 37 (also called a double-branched lobe arrangement) with the inflator 31 and tunnel 32 therebetween. It is contemplated that additional crush lobes can be added, and that different arrangements and patterns can be made. The perimeter flange 26 includes apertures, apertured bosses, or other mounting structure (not specifically shown, but see FIG. 26) facilitating attachment to a support structure for holding the construction 20 in a desired position. Notably, when the inflator 31 is ignited, the crush lobes 36, 37 expand in opposite directions. It is contemplated that an outer surface of one of the crush lobes (such as lobe 36) can be held against a support structure (such as against a beam or support 121A (FIG. 26)) such that upon deployment, the perimeter flange 26 moves and the other crush lobe (such as lobe 36) moves "twice as far" in a same direction (but a much farther distance). In other words, the crush lobes expand in opposite directions, but in a manner causing "one direction" expansion from the support 121A. Alternatively, it is contemplated that the perimeter flange 26 can provide the attachment structure (such as aperture mounting tabs) for attaching to a stationary mounting bracket, and thus hold stationary during deployment of the crush lobes 36, 37. In this circumstance, the crush lobes 36, 37 expand in opposite directions and away from the attachment structure provided by the perimeter flange. For example, this could be used in a door, with the perimeter flange 26 attached to a door inner sheet steel structure.

Notably, a size and shape of the present components and crush lobes can be varied, such as varying them in depth, height, perimeter shape, and also in sheet thicknesses, radii, and other dimensional properties. Also, the sheets can be formed (molded) with the crush lobes in expanded positions, in which case the crush lobes are forced into their collapsed positions during assembly. Alternatively, the sheets can be formed with the crush lobes in their collapsed positions as molded.

For example, it is contemplated that the sheets 21, 22 can be different thickness, depending on functional requirements of a particular application of use. For example, a functional energy absorber construction for use in a vehicle passenger compartment could include walls of 1.0 mm, 2.0 mm, or 3.0 mm thick polyolefin (or other polymer material) that can be thermoformed for low cost, and that can withstand the flexing and stresses created by the inflator 31. The sheets can be bonded together by thermal bonding, adhesive, welding, rivets, and/or other means, or can be formed as part of a single unit such as by blow molding processes.

It is contemplated that energy absorber constructions can be made having a variety of different total collapsed and expanded dimensions. For example, it is contemplated that the total collapsed dimension of the illustrated constructions can be about 15 mm to 50 mm, and the total expanded dimension can be about 60 mm to 200 mm (i.e. about a 4:1 expansion ratio). In a collapsed position of construction 20 (FIG. 17), the opposing crush lobes interfit into each other's space to thus form a compact unit of total dimension D1 (FIG. 20) of about 30 mm thickness. When the inflator 31 is ignited, compressed gases flow into the cavity between the crush lobes to first expand a first crush lobe 36 to an expanded position of dimension D2 (FIG. 20) which includes additional height of about 30-60 mm and also to expand a second crush lobe 37 to an expanded position of dimension D3 which includes additional height of about 35-70 mm. The offset ring sections have a cross section defining radii of specific dimensions for optimal rolling during expansion and collapse. The illustrated radii are between about 1 and 10 mm and have a wall thickness between about 0.5 and 5 mm so that upon rapid movement from the retracted position to the expanded position, the offset ring sections unroll and do not fracture, but during movement from the expanded position to the retracted position the offset ring sections roll in a manner absorbing energy. Also, an optimal radii will help reduce kinking and non-uniform rolling of the walls for the particular application of use.

It is contemplated that the energy absorber constructions 20 (and 120 and 220) can be tailored to provide optimal energy absorption over their full energy-absorbing stroke for desired results. For example, the energy absorber constructions can be tailored to provide energy absorption for a statistical 5% weight female human and also for a statistical 95% male human. Specifically, it is contemplated that energy absorber construction itself can be modified, such as by providing the first crush lobe (e.g., crush lobe 130) with a shape and energy-absorbing profile for decelerating a light-weight person (such as a female in the 5% weight range for women), and a second crush lobe (e.g., crush lobe 131) with a shape and energy-absorbing profile for decelerating a heavier person (such as a male in the 95% weight range for men). Alternatively, this can be done by providing two different inflators, one for the 5% weight female human, and one for the 95% male human. Sensors can be embedded in a vehicle seat to sense a passenger weight, and the controller programmed to set off the desired inflator.

The expansion of the crush lobes can be done simultaneously or in sequential steps. Thus, the crush lobe 36 can be made to absorb energy and with stroke distance and energy absorption upon collapse optimal for a 5% weight female human (or other predetermined load/resistance/deceleration) and crush lobe 37 can be made to absorb energy and with a stroke distance and energy absorption optimal for a 95% weight male human (or other predetermined load/resistance/deceleration). The energy absorption stroke can be made to have a stepped impact resistance (e.g., crush lobe 36 collapsing first in a first step for the 5% weight female, and crush lobe 37 collapsing in a second step for the 95% weight male), or both crush lobes can be made to collapse simultaneously with a constant impact resistance.

Also, it is conceived that the unexpanded energy absorber has a first energy-absorption profile (i.e., a first force/deflection curve upon impact), and that the fully expanded energy absorber (i.e., both crush lobes 36, 37 expanded) has a second energy absorption profile (i.e., second force/deflection curve upon impact), and that the energy absorber can have a third or fourth partially-expanded position (i.e., only one of the crush lobes 36, 37 expanded) to provide an intermediate energy absorption profile (i.e., a third force/deflection curve upon impact). For example, these different states of the energy absorber can be controlled by a controller with sensors for sensing a severity of the impending impact/crash.

It is contemplated that the inflator can be a prepackaged charge unit for producing a charge of pressurized inflation gas. For example, inflators including micro-gas generators are known in commerce for inflating air bags and the like in vehicles. We have found a commercial inflator can be placed in a tubular housing to assist in directing inflation gases into an air feed tunnel and toward the crush lobes. The tubular housing can assist in building and controlling gas pressure needed to expand. The inflator can be retained in the tubular housing by crimping the tubular housing 31, and the tubular housing can be retained in the pocket 30 by engaging an annular recess in the housing with a hook-like ridge in the pocket 30. It is contemplated that the inflator could comprise a pyrotechnic inflator, a compressed gas inflator, a hybrid inflator, or other inflator. In the present application, it is contemplated that the inflator can be replaced in certain circumstances with other inflating mechanisms, such as a $CO_2$ compressed gas cartridge, depending on functional requirements of the system.

It is contemplated that a mechanical fuse (also called a "weak link" herein), such as a thinned area or partial-depth slit, can be formed in one of the panels/sheets forming the crush lobes to provide a controlled exit of the compressed gas after the crush lobes are expanded. The "weak link" is mechanically weak and positioned such that it fractures upon full inflation of the crush lobes and upon the concurrent rise in pressure within the crush lobes. Thus, when the crush lobes fully inflate and internal gas pressure rises, the weak link blows out and causes a controlled exit of gas after the crush lobes are fully expanded. The result is that the crush lobes quickly expand to their fully expanded distance, but then are allowed to collapse and absorb energy through rolling material during a crushing impact without the high pressure gas inside acting as a bounce-back cushion. Restated, the compressed gas, which initially inflated the crush lobes, is allowed to escape through the hole created by the blown-out weak link. This avoids the undesirable result of the compressed gas (which inflates the crush lobes) being captured and further compressed during impact, which would result in a "punch back" or kickback force as a vehicle occupant impacts against the crush lobes.

A support 40 (FIG. 26) can be provided for supporting an instrument panel (IP) in a vehicle passenger compartment. The IP support 40 includes a driver-side area with support struts 41. The energy absorber construction 20 is attached to a beam-like structure 121A of this support 40. A cover 44 is attached over the construction 20 to provide an aesthetic visible front surface (also called a "first surface" well suited to be painted or otherwise colored to match vehicle décor). The present assembly potentially reduces components over known assemblies, and provides a very reliable, predictable and fast-acting component.

As noted above, the radii of the wrap-back sections of the crush lobes can be very important because the radii can play a significant role in getting the material of the wall section to uniformly "roll" during movement from the expanded position back toward the compressed/collapsed position during an impact. This rolling of material assists in consistently and predictably absorbing a maximum of energy absorption. Notably, the material forming the radii will flex, roll, and change as the crush lobes are expanded and also collapsed/crushed during an impact. Notably, these radii vary depending on a location along the elongated shape of the crush lobes 36, 37. It is contemplated that the shape (in plan view) can be elongated, oval, obround, or other shape best suited to provide a desired surface area of energy absorption. ("Obround" means a geometric shape having semicircles connected by linear sides. Early testing suggests that the linear wall sections should have some curvature or non-linearity to them to promote uniform expansion and contraction.) Notably, a larger radii may be necessary in the straight flat sides for proper air flow and also so that the sidewalls of the crush lobes 36, 37 roll properly, and do not shear or tear or kink. FIGS. 13-20 illustrate an obround shape, but it is contemplated that the straight side walls can be curved to define an oblong or other elongated shape.

The present energy absorber construction provides a new function in that it can expand in two opposite directions in order to fill a space during an impact, such as where the space must normally be kept open during normal vehicle function, but where the space can be compromised or taken up during a vehicle crash due to the priority of passenger safety. This two-way expansion also allows each of the crush lobes of an energy absorber construction to be expanded a shorter distance (i.e., half the distance), since the two aligned crush lobes expand in opposite directions. Testing shows that the present energy absorber construction can be made to function at low and high temperatures as are found in a vehicle passenger compartment.

For example, but not by way of limitation, concepts of the present energy absorber construction can be used in various places in a passenger vehicle (FIG. 29) including as a knee bolster 65, or pelvic absorber 66 (in a door), or thorax absorber 67 (in a door inner), or seat anti-submarine device 68 (on a seat front), or hood lifter 69 to maximize pedestrian safety upon impact, headliner absorber 70, a pillar absorber 71, rear seat absorber 72, a driver foot-ankle energy absorber (under device 65 near foot pedals), and in other locations 73 for rear passenger safety. It is contemplated that other applications exist, such as mass transit vehicles, buses, trains, planes, ships, boats, and the like. Also, non-automotive and non-passenger uses are contemplated, such as in packaging, road and construction barriers for stopping vehicles, and the like.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. An energy absorber construction comprising:
   first and second separately-formed polymeric panel members with opposing walls connected together, the opposing walls having inner and outer stiff wall sections that extend generally parallel a direction of expansion and that are sufficiently stiff to maintain their shape before and during expansion and also to absorb energy during an impact stroke, the opposing walls each defining at least one pair of crush lobes that define at least one cavity therebetween, with each crush lobe being movable between a collapsed position where the crush lobes are collapsed toward each other with the opposing walls at least partially interfitting and having adjacent interior cavities that combine to define an open space between the opposing walls with the opposing walls being adapted to undergo expansion without kinking, and an expanded position where the crush lobes are expanded in generally opposite directions; and a gas-producing inflator connected to the cavity and constructed to expand the crush lobes prior to an impact.

2. The construction defined in claim 1, wherein the first and second panel members are molded separately and are attached by one of mechanically attached, adhesively bonded, thermally bonded, or welded.

3. The construction defined in claim 1, wherein the first and second panel members are molded simultaneously by one of blow molding or injection molding.

4. The construction defined in claim 1, wherein the inflator provides gas for expanding the at least one pair of crush lobes from the retracted position to the expanded position, whereby each of the at least one pair of crush lobes provide a shorter crush stroke when in the retracted position and a longer crush stroke when in the expanded position.

5. The construction defined in claim 1, wherein the at least one pair of crush lobes are constructed to expand sequentially.

6. The construction defined in claim 1, wherein the at least one pair of crush lobes are constructed to expand simultaneously.

7. The construction defined in claim 1, wherein, upon impact, the at least one pair of crush lobes collapse simultaneously.

8. The construction defined in claim 1, wherein the at least one pair of crush lobes each provide a different level of energy absorption.

9. The construction defined in claim 1, wherein the at least one pair of crush lobes include an offset in their sidewalls constructed to unroll during extension and to roll to absorb added energy during an impact.

10. The construction defined in claim 1, wherein at least one of the panel members includes a mechanical fuse that controls exhaust of fluid from the cavity during an impact.

11. The construction defined in claim 1, wherein the inflator comprises one of a container of gas or container holding a gas generating substance.

12. The construction defined in claim 1, wherein the first and second panel members are thermoformed members.

13. The construction defined in claim 1, wherein the at least one pair of crush lobes include first and second crush lobes that are aligned, with one of the first and second crush lobes being larger than the other, and at least one of the first and second crush lobes including material extending nested into the other crush lobe when in the collapsed position.

14. The construction defined in claim 1, wherein the at least one pair of crush lobes include first and second pairs of crush lobes on right-hand and left-hand sides of the panel members.

15. The construction defined in claim 1, wherein the at least one pair of crush lobe includes first and second crush lobes on each of the first and second panel members and also an air feed tunnel defined therebetween.

16. The construction defined in claim 1, wherein the inflator is positioned between the panel members.

17. The construction defined in claim 1, wherein the at least one pair of crush lobes include first and second crush lobes that define a first dimension when in the collapsed position and a second dimension at least twice the first dimension when in the expanded position.

18. The construction defined in claim 17, wherein the second dimension is at least four times the first dimension when in the expanded position.

19. The construction defined in claim 1, wherein the inflator comprises a micro gas generator.

20. The construction defined in claim 1, wherein the inflator comprises a micro gas generator, and wherein the micro gas generator includes a diffuser.

21. An energy absorber construction comprising:

first and second separately-formed panel members with opposing walls, the opposing walls having inner and outer stiff wall sections that extend generally parallel a direction of expansion and that are sufficiently stiff to maintain their shape before and during expansion and also to absorb energy upon impact, the panels members being attached together, the opposing walls defining at least one set of aligned crush lobes extending in opposite directions and defining a sealed cavity therebetween and that are each movable between a collapsed position where the crush lobes are collapsed toward each other with the opposing walls at least partially interfitting and having adjacent interior cavities that combine to define an open space between the opposing walls, and an expanded position where the crush lobes are expanded in opposite directions, at least one of the crush lobes including sidewalls having an offset ring section defining an S-shaped cross section with arcuate portions forming opposing concavities such that the offset ring section does not include wall sections folded flat against each other, the offset ring section being adapted to unroll when the crush lobe is expanded and later roll and collapse when the crush lobe is compressed from the expanded position toward the retracted position; whereby, when the crush lobes are in the expanded position and the construction is impacted, energy is absorbed both by the offset ring section of the sidewalls rolling and also by compressed fluid in the sealed cavity.

22. The construction defined in claim 21, including an inflator connected to the cavity of the crush lobes and constructed to expand the crush lobes.

23. The construction defined in claim 21, including a mechanical fuse in one of the panel members constructed to provide an escape outlet for pressurized gas in the cavity.

24. The construction defined in claim 21, wherein the opposing walls include at least one attachment flange for securing the construction to a support.

25. An energy absorber construction comprising:

a two-direction expandable energy absorber including opposing walls of preformed polymeric material forming crush lobes sealed together to define at least two cavities and a passage connecting a center region to the two cavities, the opposing walls each including at least one of the crush lobes with the crush lobe being configured to move from an outward expanded position toward a collapsed retracted position during an impact, the opposing walls each having shallow channels combining to form the passage and also having deflector walls on one edge of the center region, and the opposing walls including inner and outer stiff wall sections that are spaced apart and extend generally parallel a direction of expansion and that maintain their shape during expansion; and an inflator located in the center region and mounted to the center region and connected to the passage at a second edge of the center region opposite the deflector walls, with the deflector walls being configured to split and direct inflator gases from the center region toward the two cavities for expanding the crush lobes from the retracted position to the expanded position.

26. The construction defined in claim 25, wherein the inflator includes a fast acting gas generating material.

27. The construction defined in claim 25, wherein the crush lobes of each panel member are aligned with another one of the crush lobes.

28. The construction defined in claim 27, wherein the aligned crush lobes interfit at least partially into each other.

29. The construction defined in claim 25, including a cover attached to one of the crush lobes having an aesthetic first surface for covering the assembly.

30. The construction defined in claim 29, wherein the support member includes a mounting bracket adapted to be attached under an instrument panel and which positions the construction to engage the passenger's knees during a vehicle impact.

31. The construction defined in claim 29, wherein the crush lobes each include a cross section with a sidewall defining at least one offset ring section with a first radii that is between about 1 and 10 mm and wall thickness between about 0.5 and 5 mm so that upon rapid movement from the retracted position to the expanded position, a stiff portion of the sidewalls causes the offset ring section to unroll without kinking, but during movement from the expanded position to the retracted position causes the offset ring section to roll in a manner absorbing energy.

32. The construction defined in claim 31, wherein the ring sections are non-circular and elongated.

33. An energy absorber construction comprising:
an energy absorber having adjacent panels forming at least one pair of aligned crush lobes configured to move between a collapsed position adjacent each other and an extended position away from each other, the crush lobes each including an outer wall section extending from the associated panel, an intermediate wall section extending from the outer wall section, the intermediate wall section defining an S-shaped cross section having arcuate portions forming opposing concavities such that the intermediate wall section does not include wall sections folded flat against each other, the arcuate portions defining first and second radii of between about 1-10 mm to provide rolling material movement during expansion and contraction of the crush lobes, and an inner wall section extending from the intermediate wall section, the intermediate wall section being a thinner thickness than the inner and outer wall sections and being more flexible than the inner and outer wall sections and also the inner and outer wall sections being sufficiently stiff to maintain their shape during expansion and being spaced from the intermediate wall section, so that during extension from the collapsed position to the extended position, ends of the intermediate wall section roll into general alignment with the inner and outer wall sections, and during collapse from the extended position toward the collapsed position, the ends of the intermediate wall section roll toward and re-align with the intermediate wall section; and
a gas-generating inflator connected to the energy absorber to cause extension of the crush lobes from the collapsed position to the extended position.

34. A method comprising steps of:
forming two panels each with at least one crush lobe therein configured to absorb energy during an impact, each crush lobe having inner and outer wall sections of at least 1 mm thickness and extending in a direction of expansion and stiff enough to maintain a shape when the at least one crush lobe is expanded and to cause an intermediate wall section to roll when impacted, the crush lobes of the two panels when mated having a total thickness dimension of at least 15 mm;
attaching the two panels together with the at least one crush lobes aligned to define a sealed cavity and facing in opposite directions, but with the crush lobes in a collapsed position with portions of opposing walls of the crush lobes interfitting and combining to define a continuous open space between the opposing walls; and
connecting a gas-generating inflator to the cavity to extend the crush lobes to an extended position.

35. The method defined in claim 34, wherein, prior to an impact which will crush the crush lobes from the extended position toward the collapsed position, operating the inflator to move the crush lobes to the extended position.

36. The method defined in claim 34, including steps of extending the crush lobes simultaneously from the collapsed position to the extended position.

37. A method comprising steps of:
providing first and second preformed separately-formed polymeric panel members with opposing walls, the opposing walls each having crush lobes defining two spaced-apart cavities with a center region therebetween, at least one of the first and second polymeric panel members having structure forming a preformed permanently-formed passage connecting the two cavities through the center region and forming a deflector wall along one edge of the center region for directing inflation gas from the center region toward the crush lobes, the crush lobes each including inner and outer stiff wall sections that extend generally parallel a direction of expansion and that are sufficiently stiff to maintain their shape during expansion;
attaching the panels members together with the crush lobes aligned, with each crush lobe being movable between a collapsed position where the crush lobes are collapsed toward each other and an expanded position where the crush lobes are expanded in generally opposite directions; and
attaching a gas-generating inflator to a second edge of the center region with the inflator operably connected to the passage and hence to the cavities, and with the crush lobes in the collapsed position, and thereafter expanding the crush lobes immediately prior to or during an impact by generating the gas with the inflator and flowing the gas from the inflator through the passage against the deflector wall and then toward the crush lobes to provide an energy absorbing device.

38. A method comprising steps of:
providing first and second separately-formed panel members with opposing walls attached together, the opposing walls defining at least one set of aligned crush lobes that interfit and that extend in opposite directions, the aligned crush lobes defining a sealed cavity therebetween and each being movable between a collapsed position where the crush lobes are collapsed toward each other and an expanded position where the crush lobes are expanded in opposite directions, at least one of the crush lobes including inner and outer stiff wall sections extending in a direction of expansion and spaced apart and being sufficiently stiff to maintain their shape during expansion, the intermediate wall section having an offset ring section defining an S-shaped cross section having arcuate portions forming opposing concavities such that the offset ring section does not include wall sections folded flat against each other, the arcuate portions when in the collapsed position each defining first and second radii of between about 1-10 mm to provide rolling material movement during expansion and contraction of the crush lobes with the arcuate portions being a thinner wall thickness than other parts of the S-shaped cross section such that the arcuate portions are more flexible; and expanding the crush lobes from the collapsed position toward the expanded position including unrolling the offset ring section to substantially eliminate the S-shaped cross section when the crush lobes are expanded and later re-rolling the offset ring section when the crush lobes are compressed during an impact from the expanded position toward the retracted position; whereby, when the crush lobes are in the expanded position and the construction is impacted, energy is absorbed both by the offset ring section of the sidewalls rolling and also by compressed fluid in the sealed cavity.

39. A method comprising steps of:

separately pre-forming two panels of polymeric material, each having walls with a thickness of at least 1 mm and having a non-uniform thickness, the walls having inner and outer wall sections extending in a direction of expansion that are sufficiently stiff to cause a radiused portion of each wall to roll and not kink when expanded and collapsed, each of the panels having at least one extendable crush lobe therein formed in part by the inner and outer wall sections and configured for compact storage but extendable prior to impact to absorb energy during an impact; and attaching the two panels together with the at least one crush lobe of each of the two panels being aligned to define a sealed cavity and facing in opposite directions, the at least one crush lobe of each of the two panels being expandable, but when in a collapsed position having portions of opposing walls of the at least one crush lobe of each of the two panels interfitting and having internal cavities that combine to define a continuous open space between the opposing walls.

* * * * *